United States Patent Office 3,213,120
Patented Oct. 19, 1965

3,213,120
TIN SALTS OF CITRIC ACID AND METHOD OF PREPARATION
Michael M. Besso, New London, Conn., assignor to Chas. Pfizer & Co., Inc., New York, N.Y., a corporation of Delaware
No Drawing. Filed Feb. 11, 1963, Ser. No. 257,782
9 Claims. (Cl. 260—429.7)

This invention deals with bivalent tin salts of citric acid. More particularly, it deals with the process of making di-stannous citrate and di-sodium stannous citrate.

The use of stannous ions is well known in the art. For example, stannous chloride is known for its use as a reducing agent, as a catalyst in organic reactions, as a stabilizer for perfume in soaps, as a tanning agent, etc. Stannous fluoride is used as a tooth paste additive. It is also known that the stannous ion is used as a stabilizer in certain food preparations, such as fruit juices. Heretofore, stannous chloride has been used as a color stabilizer in the preparation of certain frozen citrus fruit juices. Stannous chloride as a color stabilizer in said application has the disadvantage of hydrolyzing in water, thereby furnishing hydrochloric acid, an undesirable, corrosive product.

It has now been found that di-stannous citrate and di-sodium stannous citrate not only act favorably as color stabilizers in fruit juices, but that they do not have the tendency to break down to form undesirable by-products. It is, of course, preferred to use the di-sodium stannous citrate because of its ready solubility in water.

It is the principal object of this invention to provide a process for the preparation of di-sodium stannous citrate.

It is another object of this invention to provide a process for the preparation of di-stannous citrate, an intermediate in the preparation of di-sodium stannous citrate.

The compounds of the present invention are prepared by reacting a stannous salt with citric acid and an inorganic base, such as sodium hydroxide, to produce the di-stannous citrate compound. This compound is thereafter reacted further with more citric acid and base to yield the di-sodium stannous citrate product. The method described hereinbefore may be varied without departing from the scope of the invention. For example, the reaction need not be carried out in two steps as shown hereinbefore. It may be desirable to go directly to the di-sodium stannous citrate. This can be done by properly controlling the amounts of starting materials.

The reactions involved in the instant invention may be shown to be as follows:

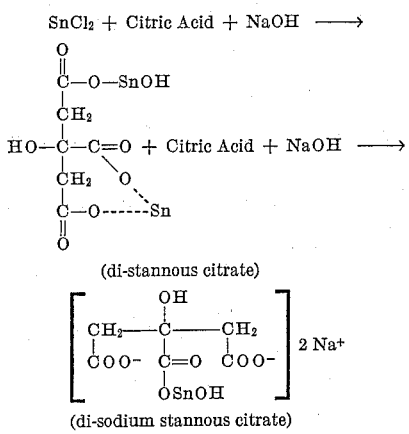

The molecular structures of the compounds are not known with certainty. They can therefore be defined only in empirical terms. One proposed structure for the di-stannous citrate compound is

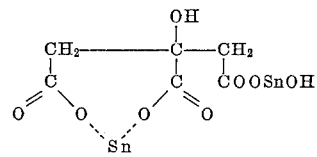

When said compound is heated at temperatures above 100° C., one molecule of water is lost and the proposed structure is

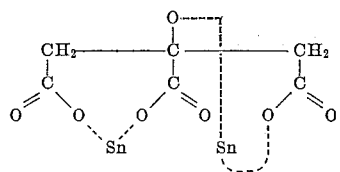

Another proposed structure for the di-stannous citrate compound is

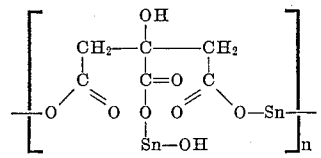

wherein $n$ is an integer of 1 or greater.

A proposed structure for the di-sodium stannous citrate compound is

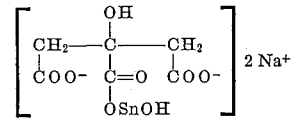

Another structure is the di-sodium stannous citrate hydrate; for example, the monohydrate.

In the preparation of the compounds of the instant invention, a stannous salt, such as stannous chloride, is added to an aqueous solution of citric acid. While stirring, a base such as sodium hydroxide, is added slowly to the mixture. The solid which is formed is di-stannous citrate. The compound is a white crystalline solid which does not melt below 250° C. At about 290° C., decomposition begins, and the compound turns brown. The decomposition temperature will vary depending upon the rate of heating. It exhibits very low solubility in water; less than 0.01 g./500 ml. water.

Optimal molar concentrations of stannous chloride/citric acid/sodium hydroxide are (1.5–20) (1) (3–4). Preferred concentrations are 2:1:4. Other concentrations may be used in obtaining the di-stannous citrate, however, the yields are less. For example, the table below shows the relative yields obtained at various molar concentrations of starting materials:

| SnCl$_2$ + | Citric Acid + | NaOH | → di-stannous citrate |
|---|---|---|---|
| 2 | 1 | 4 | → best yield |
| 1 | 1 | 2 | → ½ the best yield |
| 1 | 1 | 3 | → ¼ the best yield |

It is to be noted that as the molar concentrations of the starting materials change from the preferred concentrations the quantity of di-stannous citrate decreases. However, this decrease manifests itself in an increase of di-sodium stannous citrate which is a white crystalline solid, highly soluble in water and not melting below about 250° C. Optimal concentrations of stannous chloride/citric acid/sodium hydroxide for the preparation of di-sodium stannous citrate are (1) (1) (3–4) mole ratios and preferably 1:1:4. In the instance where di-stannous citrate is reacted with citric acid and sodium hydroxide, the preferred ratios are 1:1:4 mole ratios, respectively.

Excessive amounts of base are undesirable because of the tendency to convert the di-sodium stannous citrate which is formed to sodium stannite and sodium citrate. Not enough base will, of course, not yield the desired di-sodium stannous citrate.

This invention is not limited to stannous chloride as the starting material. Other stannous salts, such as the bromide, fluoride, iodide, hydroxide, acetate, sulfate and tartrate may be used. Further, the reaction is not limited to sodium hydroxide. Any material which yields hydroxyl ions in aqueous solution may be used. Inorganic bases such as the alkali bases and alkaline earth bases are found to be satisfactory. The hydroxides of lithium, sodium, potassium, rubidium and cesium, as well as the carbonates of these metals, ammonium hydroxide and ammonium carbonate may be used just as effectively. It is to be noted, for example, that when potassium hydroxide and ammonium hydroxide are used, the di-potassium stannous citrate and the di-ammonium stannous citrate respectively are obtained. These compounds are also found to be useful as stabilizers in fruit juices.

It is noteworthy that the pH is from about 1 to about 3 when preparing the di-stannous citrate. A pH of from about 5 to about 7 is preferred when preparing the di-sodium stannous citrate. A pH below about 5 is undesirable since the insoluble di-stannous citrate tends to precipitate out of solution.

When preparing the di-stannous citrate, the compound, being water-insoluble, precipitates out of solution. The compound may be readily filtered, washed and dried. When preparing the di-sodium stannous citrate, the solution may be evaporated to dryness and the residue washed with a lower alkanol, such as ethanol, propanol, isopropanol, and the like, or alternatively, the di-sodium stannous citrate may be precipitated from solution with any of the aforementioned alcohols, filtered, washed and dried.

Di-sodium stannous citrate was found to be ideally suited as a color stabilizer in fruit juices, and particularly in frozen citrus fruit juices. The compound, being water-soluble, can be dispersed readily throughout the juice prior to freezing. Further, the compound has been found to be stable at elevated temperatures. Also, because of the compound's inherent stability, it does not break down to produce off-flavors.

The compounds of the instant invention may be used in other applications, particularly wherein the stannous ion is desired as an anti-oxidant. The di-stannous citrate compound may be used as a stabilizer against light and heat in the manufacture of polyvinyl chloride films.

Di-stannous citrate is found to be a white crystalline solid which begins to decompose at about 290° C. The decomposition temperature will vary somewhat with the rate of heating. The compound exhibits very low solubility in water. Elemental analysis reveals 16.5% carbon, 1.3% hydrogen, 54.0% tin and the balance accounted for by oxygen. The calculated composition for the empirical formula, $C_6H_6O_8Sn_2$, is found to be 16.3% carbon, 1.4% hydrogen, 53.5% tin and the balance accounted for by oxygen.

When the $C_6H_6O_8Sn_2$ compound is heated at temperatures above 100° C., one mole of water is lost. The resultant compound is a white crystalline solid exhibiting very low solubility in water. Elemental analysis reveals 16.9% carbon, 1.2% hydrogen, 55.7% tin and the balance accounted for by oxygen. The calculated composition for the empirical formula, $C_6H_4O_7Sn_2$, is 16.9% carbon, 1.0% hydrogen, 55.9% tin and the balance accounted for by oxygen.

It is to be noted that when $C_6H_6O_8Sn_2$ is heated at temperatures above 100° C. it is converted to $C_6H_4O_7Sn_2$; therefore, the two compounds exhibit the same decomposition temperature as would be expected.

Di-sodium stannous citrate is found to be a white crystalline solid which begins to decompose at about 250° C. The decomposition temperature will vary somewhat with the rate of heating. In one instance, for example, the compound began to turn yellow at about 252° C. and turned brown at about 258° C. The compound is highly soluble in water. Elemental analysis reveals a carbon content of 19.8% and a hydrogen content of 1.6%. The calculated carbon and hydrogen contents for the empirical formula, $C_6H_6O_8SnNa_2$, are 19.4% carbon and 1.6% hydrogen.

The di-sodium stannous citrate monohydrate is a white crystalline solid which begins to decompose at about 258° C. The decomposition temperature will vary somewhat with the rate of heating. In one instance, for example, the compound began to swell at about 258° C., it turned yellow at about 268° C. and turned brown at about 283° C. The compound is highly soluble in water. Elemental analysis reveals 18.7% carbon, 1.9% hydrogen, 30.3% tin, 12.1% sodium and the balance accounted for by oxygen. The calculated composition for the empirical formula, $C_6H_8O_9SnNa_2$, is 18.5% carbon, 2.1% hydrogen, 30.5% tin, 11.8% sodium and the balance accounted for by oxygen.

It is to be noted that either form of di-stannous citrate may be used in the preparation of di-sodium stannous citrate. Further, either form of di-sodium stannous citrate is effective as a color stabilizer in fruit juices.

The invention may be more fully illustrated by the following examples. It is to be understood that the examples are given solely for the purpose of illustration only and are not to be construed as limitations of this invention, many apparent variations of which are possible without departing from the spirit or scope thereof.

EXAMPLE I

Di-stannous citrate

Into a 5 gallon flask are placed 4 liters of water and 192 g. (1 mole) anhydrous citric acid. After the acid has dissolved, 446 g. (2 moles) of stannous chloride dihydrate are added to the solution, and the mixture is stirred until a clear solution occurs. Two liters of 2 N sodium hydroxide are added dropwise over a period of two hours. The white crystalline precipitate which forms is filtered, washed twice with 1.5 liters of water and dried at 78° C. at 0.2 mm. pressure to yield 438 g. of di-stannous citrate. The solubility of this product is about 0.01 g./500 ml. of water. The analysis for $C_6H_6O_8Sn_2$ is:

Calculated: C, 16.3%; H, 1.4%; Sn, 53.5%.
Found: C, 16.5%; H, 1.3%; Sn, 54.0%.

When the $C_6H_6O_8Sn_2$ compound is dried at 138° C. for 24 hours, one mole of water is lost. The analysis for $C_6H_4O_7Sn_2$ is:

Calculated: C, 16.9%; H, 1.0%; Sn, 55.9%.
Found: C, 16.9%; H, 1.2%; Sn, 55.7%.

EXAMPLE II

Di-sodium stannous citrate

Into 1.5 liters of water are stirred 222 g. of di-stannous citrate, $C_6H_6O_8Sn_2$ (0.5 mole) and 96 g. of citric acid (0.5 mole). One liter of 2 N sodium hydroxide is added dropwise with vigorous stirring over a period of about one hour. The solution is filtered, to remove any suspended particles, and evaporated to dryness on a rotator vacuum. The oil which remains is washed with 1.3 liters of isopropanol and vacuum dried in an oven at 70° C. at about 0.3 mm. pressure. The di-sodium stannous citrate (321 g.) crystallizes out as a white solid having a high degree of water solubility. The analysis for $C_6H_6O_8SnNa_2$ is:

Calculated: C, 19.4%; H, 1.6%.
Found: C, 19.8%; H, 1.6%.

EXAMPLE III

Di-sodium stannous citrate

One mole of stannous chloride dihydrate (224 g.) and 1 liter of 2 N sodium hydroxide solution are added to a flask containing 500 ml. of water. A white precipitate of stannous hydroxide is formed. The solid is filtered and washed with water. The solid is then dispersed in 500 ml. of water. One mole of anhydrous citric acid (192 g.) is added to the dispersion, followed by the dropwise addition with stirring of 1 liter of 2 N sodium hydroxide. The resultant solution is filtered, to remove any suspended particles, and evaporated to dryness on a rotator vacuum. The oil which remains after evaporating the water is vacuum dried in an oven at 70° C. at about 0.3 mm. pressure. The di-sodium stannous citrate crystallizes out as a white solid exhibiting a high degree of solubility in water.

EXAMPLE IV

Di-sodium stannous citrate monohydrate

Fifteen moles (6.34 lbs.) citric acid are dissolved in 15.85 gallons of distilled water. Thirty moles (15 lbs.) of stannous chloride dihydrate are added to the solution followed by the slow addition of 7.9 gallons of 2 N sodium hydroxide solution. The crude cake which precipitates out is filtered and washed with 5 gallons of distilled water. The crude cake is slurried in 6 gallons of distilled water, and to this slurry are added fifteen moles (6.34 lbs.) citric acid. 7.9 gallons of 2 N sodium hydroxide solution are slowly added to the mixture. The mixture is filtered to remove any suspended particles and stannous hydroxide which may have formed. The filtrate is concentrated under reduced pressure to remove water. The oil which remains is spread out on trays and dried under reduced pressure. The di-sodium stannous citrate crystallizes out as a white solid exhibiting a high degree of solubility in water. The analysis for $C_6H_8O_9SnNa_2$ is:

Calculated: C, 18.5%; H, 2.1%; Sn, 30.5%; Na, 11.8%.
Found: C, 18.7%; H, 1.9%; Sn, 30.3%; Na, 12.1%.

What is claimed is:

1. A method for the preparation of white, crystalline, di-stannous citrate, substantially insoluble in water, and which does not melt below about 290° C., which comprises reacting from about 1.5 to about 2.0 moles of a stannous salt selected from the group consisting of stannous chloride, stannous bromide, stannous fluoride, stannous iodide, stannous acetate, stannous hydroxide, stannous sulfate and stannous tartrate with substantially 1 mole of citric acid and from about 3 to about 4 moles of an inorganic base selected from the group consisting of alkali metal, alkaline earth metal and ammonium hydroxides and carbonates, while maintaining the reaction at a pH of from about 1 to about 2.

2. A method for the preparation of white, crystalline, di-sodium stannous citrate, soluble in water, and which does not melt below about 250° C., which comprises reacting substantially 1 mole of a stannous salt selected from the group consisting of stannous chloride, stannous bromide, stannous fluoride, stannous iodide, stannous acetate, stannous hydroxide, stannous sulfate, stannous tartrate and di-stannous citrate with substantially 1 mole of citric acid and from about 3 to about 4 moles of sodium hydroxide, while maintaining the reaction at a pH of from about 5 to about 7.

3. The method of claim 1 wherein the stannous salt is stannous chloride.

4. The method of claim 2 wherein the stannous salt is stannous chloride.

5. The method of claim 2 wherein the stannous salt is di-stannous citrate.

6. The method of claim 2 wherein the product is recovered by removal of the water from the reaction mixture and thereafter drying the residual oil remaining until said product crystallizes out.

7. White, crystalline di-stannous citrate which exhibits an elemental alalysis corresponding to

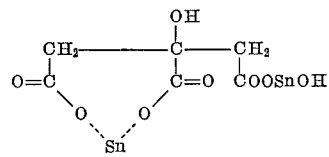

which exhibits a decomposition temperature of about 290° C., and which is substantially insoluble in water.

8. White, crystalline di-stannous citrate which exhibits an elemental analysis corresponding to

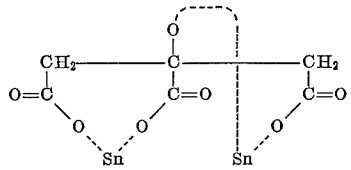

which exhibits a decomposition temperature of about 290° C., and which is substantially insoluble in water.

9. A compound selected from the group consisting of white, crystalline di-sodium stannous citrate which exhibits an elemental analysis corresponding to

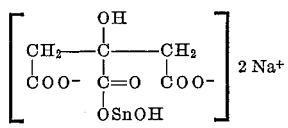

and a decomposition temperature of about 250° C. and which is highly soluble in water, and the monohydrate of said citrate.

References Cited by the Examiner

UNITED STATES PATENTS 2,417,071   3/47   Gebhart et al. _____ 260—429.7
2,727,875   12/55   Mack _____ 260—429.7

TOBIAS E. LEVOW, *Primary Examiner.*

UNITED STATES PATENT OFFICE
CERTIFICATE OF CORRECTION

Patent No. 3,213,120

October 19, 1965

Michael M. Besso

It is hereby certified that error appears in the above numbered patent requiring correction and that the said Letters Patent should read as corrected below.

Column 2, line 52, for "(1.5-20)" read -- (1.5-2.0) --.

Signed and sealed this 14th day of June 1966.

(SEAL)
Attest:

ERNEST W. SWIDER
Attesting Officer

EDWARD J. BRENNER
Commissioner of Patents